(12) United States Patent
Kong et al.

(10) Patent No.: US 7,373,146 B2
(45) Date of Patent: May 13, 2008

(54) METHOD OF CROSS-PAGING A HYBRID ACCESS TERMINAL SUPPORTING VOICE SERVICE AND PACKET DATA SERVICE

(75) Inventors: Dong-Keon Kong, Suwon-si (KR);
Tae-Won Kim, Anyang-si (KR);
Hong-Sung Chang, Suwon-si (KR);
Sang-Do Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 134 days.

(21) Appl. No.: 10/764,552

(22) Filed: Jan. 27, 2004

(65) Prior Publication Data

US 2004/0185879 A1    Sep. 23, 2004

(30) Foreign Application Priority Data

Jan. 28, 2003    (KR)    ............ 10-2003-0005547

(51) Int. Cl.
*H04Q 7/20*    (2006.01)
(52) U.S. Cl. .............. 455/426.1; 455/435; 455/466; 455/451; 455/515; 455/426.1; 455/458; 455/452.1; 370/328; 370/310
(58) Field of Classification Search .......... 455/435, 455/466, 451, 515, 458, 452, 456.1; 370/328
See application file for complete search history.

(56) References Cited

U.S. PATENT DOCUMENTS 6,961,578 B2 * 11/2005 Silver et al. ............. 455/456.3

2003/0143999 A1 * 7/2003 Funato et al. ............ 455/435
2004/0120283 A1 * 6/2004 Rezaiifar et al. .......... 370/328

\* cited by examiner

*Primary Examiner*—Joseph Feild
*Assistant Examiner*—Randy Peaches
(74) *Attorney, Agent, or Firm*—Roylance, Abrams, Berdo & Goodman, L.L.P.

(57) ABSTRACT

Provided is a method of cross-paging including transmitting mobile terminal location information from a mobile communication system to a heterogeneous mobile communication system after the mobile terminal location registration. The mobile communication system is then requested to page the mobile terminal according to the received information in the heterogeneous mobile communication system and, then the mobile terminal is paged. Further provided is a method of cross-paging that includes determining whether the mobile terminal has been location-registered in the mobile communication system or in the heterogeneous mobile communication system with reference to pre-registered mobile terminal location information when a mobile terminal paging request occurs in the heterogeneous mobile communication system. A cross-paging message is then transmitted from the heterogeneous mobile communication system to the mobile communication system if the mobile terminal has been location-registered in the mobile communication system and then the mobile terminal is paged.

10 Claims, 10 Drawing Sheets

REGISTRATION MESSAGE

| FIELD | LENGHT(bits) |
|---|---|
| REG_TYPE | 4 |
| SLOT_CYCLE_INDEX | 3 |
| MOB_P_REV | 8 |
| SCM | 8 |
| MOB_TEM | 1 |
| RETURN_CAUSE | 4 |
| ... | |
| UI_ENCRYPT_SUP | 0 or 8 |

FIG.4

STATION CLASS MARK(SCM)

| FIELD | BIT(s) | SETTING |
|---|---|---|
| EXTENDED SCM INDOCATOR | 7 | |
| DUAL MODE(=TTI) | 6 | CDMA ONLY = 0<br>DUAL MODE = 1 |
| SLOTTED CLASS | 5 | |
| ... | | |
| TRANSMISSION | 2 | |
| POWER CLASS FOR BAND CLASS 0 ANALOG OPERATION | 1-0 | |

FIG.5

LOCATION UPDATE REQUEST MESSAGE

| INFORMATION ELEMENTS | TYPE | |
|---|---|---|
| CALL IDENTIFIER | M | |
| PROTOCOL DISCRIMINATOR | M | |
| RESERVED-OCTET | M | |
| MESSAGE TYPE | M | |
| MOBILE IENTITY (IMSI) | M | |
| CLASSMARK INFORMATION TYPE2 | O | R |
| REGISTRATION TYPE | O | R |
| MOBILE IDENTITY (ESN) | O | C |
| SLOT CYCLE INDEX | O | C |
| . . . | | |

M : MANDATORY
R : REQUIRED
O : OPTIONAL
C : CONDITIONALLY REQUIRED

FIG.6

A14-GENERAL UPDATE MEASSAGE

| INFORMATION ELEMENTS | TYPE | |
|---|---|---|
| A14 MEASSAGE TYPE | M | |
| ATI (RATI) | O | R |
| CORRELATION ID | O | C |
| SECTOR ID (REGISTERED SECTOR) | O | R |
| SECURITY LAYER PACKET | O | C |
| SYSTEM TIME | O | C |
| ACCESS NETWORK IDENTIFIERS | O | C |
| SESSION STATE INFORMATION RECORD | O | C |
| A14 INDICATORS | O | C |
| CELL IDENTIFIER | O | C |
| MOBILE IDENTITY (IMSI/ESN) | M | |
| CLASS MARK INFORMATION TYPE2 | O | R |
| SLOT CYCLE INDEX | O | C |
| ... | | |

A14-PAGING REQUEST MESSAGE

| INFORMATION ELEMENTS | TYPE | |
|---|---|---|
| A14 MEASSAGE TYPE | M | |
| ATI (RATI) | 0 | R |
| CORRELATION ID | 0 | C |
| SECTOR ID (REGISTERED SECTOR) | 0 | R |
| SECTOR ID LIST | 0 | C |
| SESSION STATE INFORMATION RECORD | 0 | R |
| A14 INDICATORS | 0 | R |
| MOBILE IDENTITY (IMSI/ESN) | M | |
| SERVICE OPTION | 0 | R |
| CELL IDENTIFIER LIST | 0 | C |
| SLOT CYCLE INDEX | 0 | C |
| . . . | | |

FIG.10

CROSS PAGE REQUEST

| INFORMATION ELEMENTS | TYPE | |
|---|---|---|
| MEASSAGE TYPE | M | |
| MOBILE IDENTITY (IMSI/ESN) | M | |
| CELL IDENTIFIER LIST | 0 | C |
| SLOT CYCLE INDEX | 0 | C |
| SERVICE OPTION | 0 | R |
| . . . | | |

METHOD OF CROSS-PAGING A HYBRID ACCESS TERMINAL SUPPORTING VOICE SERVICE AND PACKET DATA SERVICE

This application claims priority to an application entitled "Method of cross-paging hybrid access terminal supporting voice service and packet data service" filed in the Korean Industrial Property Office on Jan. 28, 2003 and assigned Serial No. 2003-5547, the contents of which are incorporated herein by reference.

BACKGROUND OF THE INVENTION

1. Field of the Invention

The present invention relates to mobile communication service, and more particularly to a method of paging a hybrid access terminal supporting both voice service and high-speed packet data service.

2. Description of the Related Art

In general, wireless communication systems performing 3rd generation wireless communication include, for example, Code Division Multiple Access (CDMA) 2000 1x, Wideband Code Division Multiple Access/Universal Mobile Telecommunications System (WCDMA/UMTS), General Packet Radio System (GPRS) and CDMA 2000 Evolution in Data Only (1xEV-DO).

As the system standard is currently being changed from IS-2000 which corresponds to a CDMA 2000 1x standard capable of simultaneously supporting voice service and packet data service to IS-856 which corresponds to a CDMA 2000 1xEV-DO standard supporting only high-speed packet data service, a hybrid access terminal (HAT) capable of having access to the two systems has been developed. The hybrid access terminal is designed to simultaneously monitor both the CDMA 2000 1xEV-DO system and the CDMA 2000 1x system, but automatically shifts to a state in which it monitors only the CDMA 2000 1x system if an idle state of the CDMA 2000 1xEV-DO system lasts for a predetermined period of time in order to further reduce battery consumption.

A system capable of transmitting large capacity data such as the CDMA 2000 1xEV-DO system provides a multimedia message service (MMS) which is an improvement over the existing short message service (SMS) to satisfy the additional variety of customer demands. The multimedia message service is a service which enables not only characters, but also multimedia data including graphics or photograph, music and video clips to be given and taken via a mobile terminal. By virtue of the improvement in speed in wireless communication, the launch of color terminals capable of reproducing moving pictures, etc., it is expected that the multimedia message service hereafter occupies the heart of the 3rd generation mobile communication service. Therefore, the major mobile communication service providers also show a great interest in constructing the multimedia message service and are preparing a variety of supplementary services applying the multimedia message service, such as photographs, messages, moving picture cards, moving advertisements, etc.

Similarly for the short message service, a multimedia message service is provided by using an overhead channel, not a traffic channel such as a control channel or a paging channel. A mobile terminal periodically or continuously monitors additional channels in an idle state so as to obtain a short message or a multimedia message and to respond to a paging from a system.

However, as described above, if a predetermined period of time elapse after an idle state of the CDMA 2000 1xEV-DO system starts, the hybrid access terminal automatically shifts to a state in which it monitors only the CDMA 2000 1x system while simultaneously monitoring both the CDMA 2000 1xEV-DO system and the CDMA 2000 1x system. Accordingly, the hybrid access terminal has a problem in that it cannot continuously monitor the CDMA 2000 1xEV-DO system, and thus cannot use a multimedia message service through the CDMA 2000 1xEV-DO system.

SUMMARY OF THE INVENTION

Accordingly, the present invention has been made to solve the above-mentioned problems occurring in the prior art, and an object of the present invention is to provide a method of providing a multimedia message service to a hybrid access terminal supporting both a Code Division Multiple Access (CDMA) 2000 1x system and a CDMA 2000 Evolution in Data Only (1xEV-DO) system.

Another object of the present invention provides a method of making the hybrid access terminal respond to an incoming paging from the CDMA 2000 1xEV-DO system while monitoring only the CDMA 2000 1x system.

Still another object of the present invention provides a method of reducing battery consumption by decreasing the number of overhead channels through which the hybrid access terminal is periodically and alternately connected to the CDMA 2000 1x system and the CDMA 2000 1xEV-DO system.

Yet still another object of the present invention provides a method of reducing situations in which the hybrid access terminal cannot receive a broadcasting message of the CDMA 2000 1x system, which situation may occur while the hybrid access terminal monitors the CDMA 2000 1xEV-DO system.

In order to substantially accomplish this object, a method provides for performing a paging from a first mobile communication system or a second mobile communication system to a mobile terminal, the first mobile communication system providing voice service and packet data service, the second mobile communication system providing only packet data service, the mobile terminal being capable of communicating the first and the second mobile communication systems, the method comprising the steps of: the first mobile communication system providing location information of the mobile terminal to the second mobile communication system when the mobile terminal performs location registration; the second mobile communication system requesting a paging of the mobile terminal to the first mobile communication system on the basis of provided information when a paging to the mobile terminal is required; and the first mobile communication system generating a paging message which includes information to notify a paging requested from the second mobile communication system and transmitting the generated paging message to the mobile terminal when a paging of the mobile terminal is requested from the second mobile communication system.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, a cross-paging method of a hybrid access terminal supporting voice service and packet data service according to embodiments of the present invention will be described with reference to the accompanying drawings. In the following description of the present invention, a detailed description of known functions and configurations incorporated herein will be omitted for conciseness.

According to the essential idea of the present invention, a hybrid access terminal supporting both a Code Division Multiple Access (CDMA) 2000 1x system and a CDMA 2000 Evolution in Data Only (1xEV-DO) system can get a multimedia message service from the CDMA 2000 1xEV-DO system while monitoring only the CDMA 2000 1x system. Further, the present invention can be applied to a different kind of heterogeneous mobile communication systems as well as a system comprised of the CDMA 2000 1x system and the CDMA 2000 1xEV-DO system as described above. For example, when the CDMA 2000 1x system is applied as one mobile communication system, a CDMA 2000 1xEV-DV system, etc. as well as the CDMA 2000 1xEV-DO system described in the present application can be applied as a heterogeneous mobile communication system.

Figure 1:
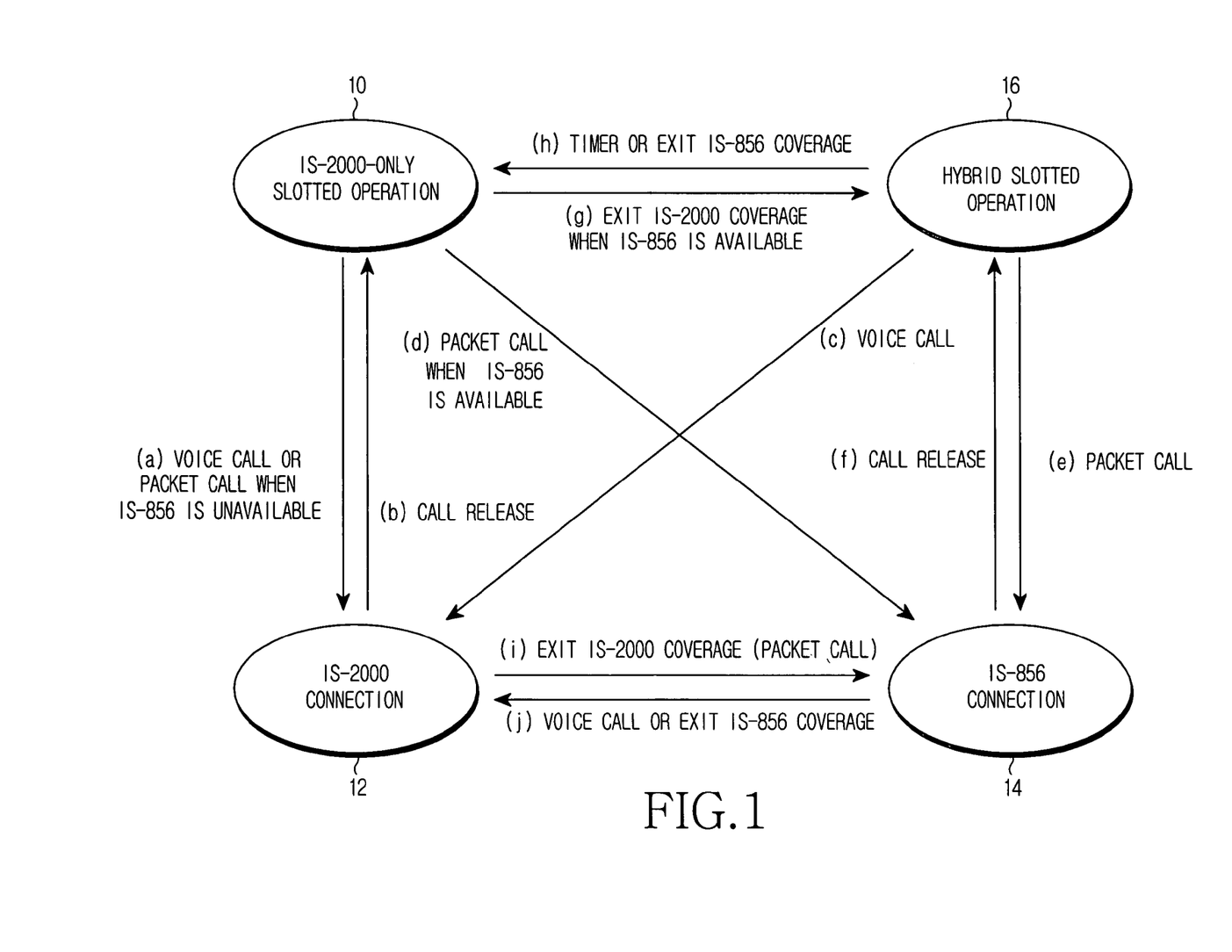
FIG. 1 is a diagram illustrating operation modes of a hybrid access terminal in the 3rd generation wireless communication system.

FIG. 1 is a diagram illustrating operation modes of a hybrid access terminal in the 3rd generation wireless communication system. In this drawing, 'IS-2000' represents a CDMA 2000 1x system, and 'IS-856' represents a CDMA 2000 1xEV-DO system.

Referring to FIG. 1, after the hybrid access terminal receives an overhead message from a paging channel, which is a control channel of the CDMA 2000 1x system, to perform an initial acquisition operation, the hybrid access terminal is switched to an IS-2000-Only slotted operation mode 10 to perform a slot operation for monitoring assigned slots of the paging channel. After detecting the CDMA 2000 1xEV-DO system, the hybrid access terminal performs the slot operation for both the CDMA 2000 1x system and the CDMA 2000 1xEV-DO system, and the hybrid access terminal is in a hybrid slotted operation mode 16. That is, the hybrid slotted operation mode 16 represents an IS-856 and IS-2000 slot operation mode.

In the hybrid slotted operation mode 16, when a voice call should be incoming or outgoing, the hybrid access terminal sets an IS-2000 1x call and is switched to an IS-2000 connection mode 12 (step c), and when a packet call should be incoming or outgoing, the hybrid access terminal sets an IS-856 packet call and is switched to an IS-856 connection mode 14 (step e). Even while the IS-856 packet call is maintained, the hybrid access terminal continuously monitors the CDMA 2000 1x system.

If the hybrid access terminal fails to acquire the CDMA 2000 1xEV-DO system in the IS-2000-Only slotted operation mode 10, the hybrid access terminal periodically tries to acquire the IS-856 system, staying at the IS-2000-ONLY slotted operation mode 10. In this condition, when a voice call should be incoming or outgoing, the hybrid access terminal sets an IS-2000 call and is switched to the IS-2000 connection mode 12 (step a). If a packet call should be incoming or outgoing, the hybrid access terminal sets an IS-2000 packet call or an IS-856 packet call and is switched to the IS-2000 connection mode 12 or the IS-856 connection mode 14 (step a or d). When a voice call or a packet call is released in the IS-2000 connection mode 12, the hybrid access terminal is switched to the IS-2000-Only slotted operation mode 10 (step b), and when a packet call is released in the IS-856 connection mode 14, the hybrid access terminal is switched to the hybrid slotted operation mode 16 (step f).

As described above, in the IS-2000-Only slotted operation mode 10, the hybrid access terminal monitors only the paging channel of the CDMA 2000 1x system, but does not monitor a control channel of the CDMA 2000 1xEV-DO system.

Simplified description of operations according to modes of the above-mentioned hybrid access terminal is as follows.

IS-2000-Only Slotted Operation Mode 10
When an incoming or an outgoing request for a voice call occurs, the hybrid access terminal sets a CDMA 2000 1x call and is switched to the IS-2000 connection mode 12, so that voice service is achieved (step a).
When an outgoing request for a packet call occurs, if the CDMA 2000 1xEV-DO system cannot be used, the hybrid access terminal sets a CDMA 2000 1x call and is switched to the IS-2000 connection mode 12, so that packet service is achieved (step a).
When an outgoing request for a packet call occurs, if the CDMA 2000 1xEV-DO system can be used, the hybrid access terminal sets a CDMA 2000 1xEV-DO call and is switched to the IS-856 connection mode 14, so that packet service is achieved (step d).
When an incoming request for a packet occurs, the hybrid access terminal sets a CDMA 2000 1x call and is switched to the IS-2000 connection mode 12, so that packet service is achieved (step a).
Incoming CDMA 2000 1xEV-DO packet call is impossible.
When getting out of an area of the CDMA 2000 1x system, the hybrid access terminal is switched to the hybrid slotted operation mode 16 (step g).
IS-2000 Connection Mode 12
Voice and packet services are achieved through a CDMA 2000 1x call.
When a call is released, the hybrid access terminal is switched to the IS-2000-Only slotted operation mode 10 (step b).

During packet service, when getting out of the area of the CDMA 2000 1x system, the hybrid access terminal sets a CDMA 2000 1xEV-DO call and is switched to the IS-856 connection mode 14, so that packet service is continuously maintained (step i).

IS-856 Connection Mode 14

Voice and packet services are achieved through a CDMA 2000 1xEV-DO call.

When a call is released, the hybrid access terminal is switched to the hybrid slotted operation mode 16 (step f).

When an incoming/outgoing request for a voice call occurs, the hybrid access terminal sets a CDMA 2000 1x call and is switched to the IS-2000 connection mode 12, so that voice and packet services are achieved (step j).

When getting out of an area of the CDMA 2000 1xEV-DO system, the hybrid access terminal sets a CDMA 2000 1x call and is switched to the IS-2000 connection mode 12, so that packet service is continuously maintained (step j).

Hybrid Slotted Operation Mode 16

When in the area of the CDMA 2000 1xEV-DO system, the hybrid access terminal monitors only the CDMA 2000 1xEV-DO system.

When an incoming/outgoing request for a voice call occurs, the hybrid access terminal sets a CDMA 2000 1x call and is switched to the IS-2000 connection mode 12, so that voice service is achieved (step c).

When an incoming/outgoing request for a packet call occurs, the hybrid access terminal sets a CDMA 2000 1xEV-DO call and is switched to the IS-856 connection mode 14, so that packet service is achieved (step e).

When a predetermined time of a timer expires, the hybrid access terminal is switched to the IS-2000-Only slotted operation mode 10 (step h).

When getting out of the area of the CDMA 2000 1xEV-DO system, the hybrid access terminal is switched to the IS-2000-Only slotted operation mode 10 (step h).

Figure 2:
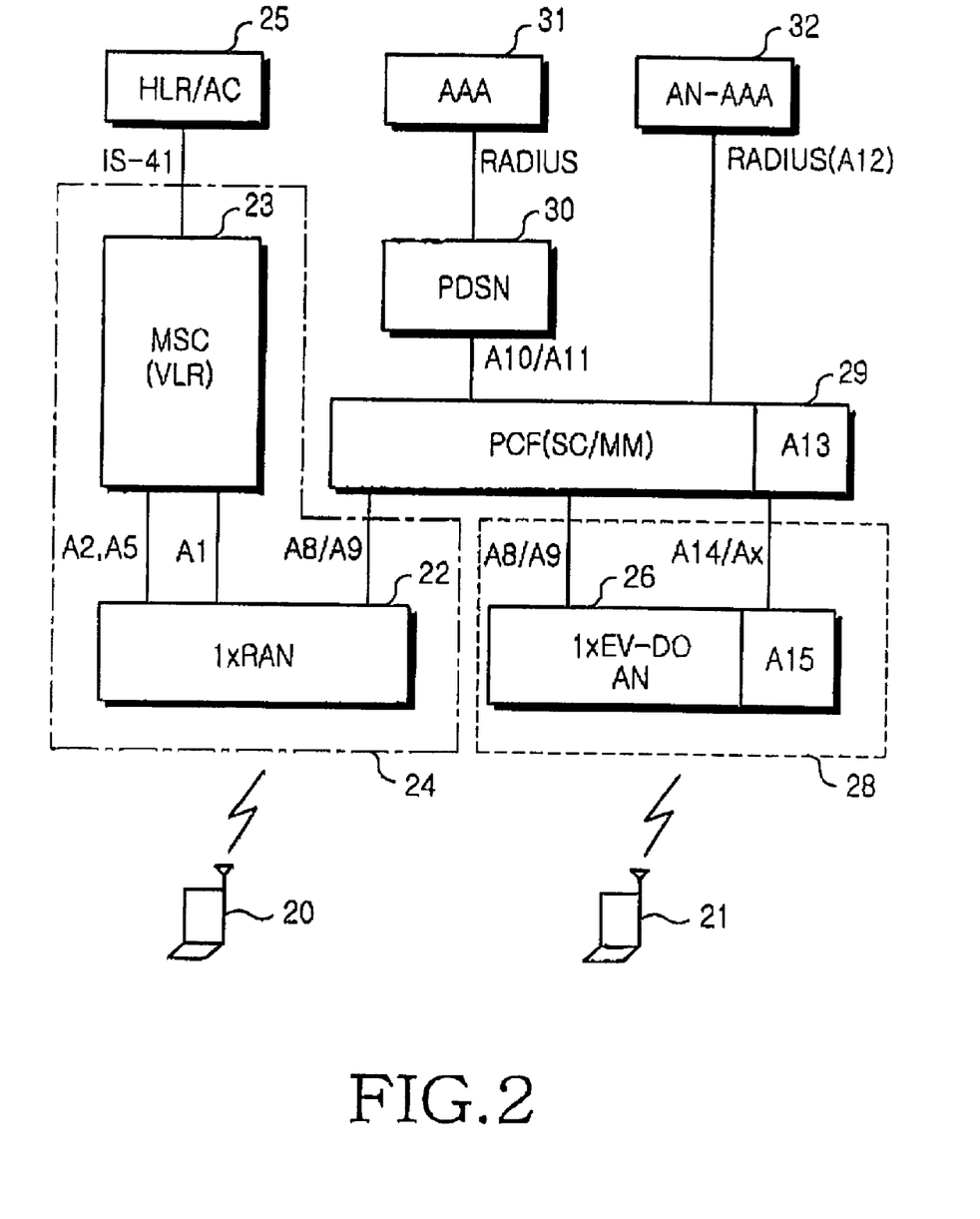
FIG. 2 is a block diagram illustrating a general network structure of a Code Division Multiple Access (CDMA) 2000 1x system and a CDMA 2000 Evolution in Data Only (1xEV-DO) system.

FIG. 2 is a block diagram illustrating a general network structure of the CDMA 2000 1x system and the CDMA 2000 1xEV-DO system which perform the above-mentioned operation. As shown in FIG. 2, hybrid access terminals 20 and 21 can communicate with a CDMA 2000 1x base station (Radio Access Network: RAN) (hereinafter, referred to as "1x base station") 22 of a CDMA 2000 1x system 24 and a CDMA 2000 1xEV-DO base station (Access Network: AN) (hereinafter, referred to as "1xEV-DO base station") 26 of a CDMA 2000 1xEV-DO system 28.

The 1x base station 22 of the CDMA 2000 1x system 24 is connected to a mobile switching center (MSC) 23 and a packet control function (PCF) 29 and provides voice and packet services to the terminals. That is, the mobile switching center (MSC) 23 stores subscriber information obtained from a home location register (HLR)/authorization center (AC) 25 into a visitor location register (VLR) which is an internal database and provides voice service to terminals connected through the 1x base station 22. The visitor location register (VLR), an internal database in which subscriber information is stored, can be constructed inside of the mobile switching center 23 as described above, but may also be constructed as a separate external device connected to the mobile switching center 23. Also, the 1x base station 22 is connected to the packet control function (PCF) 29 to provide packet data service to the hybrid access terminals 20 and 21.

The 1xEV-DO base station 26 of the CDMA 2000 1xEV-DO system 28 is connected to the packet control function 29 to provide packet service to terminals connected to the 1xEV-DO base station 26.

The packet control function 29 is connected to a data network through a packet data service node (PDSN) 30 and performs data packet service according to subscriber information obtained from authentication authorization accounting (AAA) servers 31 and 32. Specifically, the packet control function 29 stores the subscriber information obtained from an AN-AAA server 32 into an internal session control and mobility management (hereinafter, referred to as "SC/MM") function section and provides packet service using the stored subscriber information. The SC/MM function section can be constructed inside of the packet control function 29 as described above, but may be also constructed as an external device connected through separate connection means.

Each of the 1x base station 22 and the 1xEV-DO base station 26 is connected with mobile terminals located in its own service area through wireless channels and performs communication. The hybrid access terminals 20 and 21, shown in FIG. 2, communicate with the 1x base station 22 while being located in a service area of the 1x base station 22, and they communicate with 1xEV-DO base station 26 while being located in a service area of the 1xEV-DO base station 26. In a case in which the 1x base station 22 and the 1xEV-DO base station 26 are collocated in a same area, the hybrid access terminals 26 and 27 can communicate with both the base stations 22 and 26.

To be more specific, the CDMA 2000 1x system 24 supports not only voice service but also packet data service of up to 144 Kbps using an air interface of the IS-2000 standard. In the CDMA 2000 1x system 24, in a case of a voice call, the 1x base station 22 interacts with the mobile switching center 23, and in a case of a packet data call, the 1x base station 22 interacts with the packet data service node 30 through the packet control function 29. When a packet data call is set up, the 1x base station 22 performs a radio session negotiation with a hybrid access terminal 20 access to the 1x base station 22, and location information of the hybrid access terminal 20 is stored in the visitor location register inside of the mobile switching center 23.

The CDMA 2000 1xEV-DO system 28 is designed to support only packet data service at high speed and can provide data service of up to 2 Mbps using the IS-856 standard as an air interface. The 1xEV-DO base station 26 interacts with the packet data service node 30 through the packet control function 29. At this time, the packet control function 29 is unnecessary, and location information of the hybrid access terminal 21 access to the 1xEV-DO base station 26 is stored in the SC/MM function section. The SC/MM function section is logically located in the packet control function 29, stores session information (that is, a keep alive timer, a terminal identifier (MINID), mapping information between the terminal identifier and an unicast access terminal identifier (hereinafter referred to as "UATI"), etc.) of a terminal existing in its dormant state in which it has access to the CDMA 2000 1xEV-DO system 28, and performs functions of UATI assignment, terminal authentication, and mobility management.

The function of interfaces shown with reference mark 'A' in FIG. 2 are as follows.

Interface 'A1' permits signaling information to be transferred between call-control functions and mobility-management functions of the mobile switching center and a base station controller (BSC) which is a call control factor for a base station.

Interface 'A2' permits pulse code modulation (PCM) information to be transferred between a switch device of the mobile switching center and a selection/distribution unit (SDU) of a base station.

Interface 'A5' permits a full duplex stream to be transferred between the mobile switching center and the selection/distribution unit.

Interface 'A7' permits signaling information to be transferred between a source base station and a destination base station.

Interface 'A8' permits user traffic to be transferred between a base station and the packet control function.

Interface 'A9' permits signaling information to be transferred between a base station and the packet control function.

Interface 'A10' permits user traffic to be transferred between the packet control function and the packet data service node.

Interface 'A11' permits signaling information to be transferred between the packet control function and the packet data service node.

Interface 'A12' permits signaling information to be transferred between the packet control function and the authentication authorization accounting server.

Interface 'A13' permits signaling information to be transferred between SC/MM function sections of a destination packet control function and a source packet control function.

Interface 'A14' permits signaling information to be transferred between the SC/MM function section of the packet control function and the 1xEV-DO base station.

Interface 'A15' permits signaling information to be transferred between 1xEV-DO base stations when inter-AN paging inside of the 1xEV-DO base stations is used.

Interface 'Ax' permits user traffic to be transferred between the SC/MM function section of the packet control function and the 1xEV-DO base station.

Considering only the case of connecting to the CDMA 2000 1x system and the CDMA 2000 1xEV-DO system using a hybrid access terminal, not a single-mode mobile terminal, the hybrid access terminal monitors both of the CDMA 2000 1x system and the CDMA 2000 1xEV-DO system in which there is no control operation in the hybrid slotted operation mode 16. As described above, the hybrid access terminal is automatically switched from the hybrid slotted operation mode 16 to IS-2000-Only slotted operation mode 10, and the hybrid access terminal cannot monitors a control channel of the CDMA 2000 1xEV-DO system in the IS-2000-Only slotted operation mode 10.

Therefore, according to the embodiment of the present invention, when the hybrid access terminal registers its own location in the hybrid slotted operation mode 16 or the IS-2000-Only slotted operation mode 10 to the CDMA 2000 1x system, the CDMA 2000 1x system provides location information, registered from the hybrid access terminal, to the CDMA 2000 1xEV-DO system so that the CDMA 2000 1xEV-DO system can transmit a 'paging request' to the hybrid access terminal. Herein, the 'paging request' refers to a paging request message notifying the of an incoming packet data call from the CDMA 2000 1xEV-DO system and a data burst message for receipt of a multimedia message.

Location update and cross-paging should be considered on the system side. Herein, the cross-paging refers to either to an operation in which a hybrid access terminal in an idle state of the CDMA 2000 1x system obtains paging information of the CDMA 2000 1xEV-DO system, or that a hybrid access terminal in an active state of the CDMA 2000 1xEV-DO system obtains voice-call paging information of the CDMA 2000 1x system, or that a hybrid access terminal in an active state of the CDMA 2000 1x system obtains paging information of the CDMA 2000 1xEV-DO system, thereby switching so that simultaneous voice and data (SVD) service can be performed. In the embodiment of the present invention, the term cross-paging refers to an operation in which a hybrid access terminal in an idle state of the CDMA 2000 1x system obtains paging information of the CDMA 2000 1xEV-DO system.

Operations required for the location update and the cross-paging of a hybrid access terminal are as follows.

For the location registration, the 1x base station 22 provides location information received from the hybrid access terminal 20 to the 1xEV-DO base station 26. The SC/MM function section of the packet control function 29 processes all location information according to an international mobile station identifier (hereinafter, referred to as "IMSI") used for user identification in the CDMA 2000 1x system and an UATI used for user identification in the CDMA 2000 1xEV-DO system.

Also, for the cross-paging, the 1x base station 22 and the 1xEV-DO base station 26 relay cross-paging massages to each other, and use a predetermined service option (SO) 59 so that the hybrid access terminal in an idle state of the CDMA 2000 1x system can receive paging information of the CDMA 2000 1xEV-DO system through the cross-paging. When a paging is generated in the CDMA 2000 1xEV-DO system, the SC/MM function section of the packet control function 29 transmits a paging message to the 1xEV-DO base station 26 on the basis of location information provided from the CDMA 2000 1x system through interface 'A14'.

During performance of a voice call, when the hybrid access terminal receives a paging request of the CDMA 2000 1xEV-DO system, the hybrid access terminal is switched to enable simultaneous voice and data (SVD) service to be performed. Also, when the hybrid access terminal in an idle state enters a service area of an 1xEV-DO base station, if there has been Point to Point Protocol (PPP) session information set up with the 1xEV-DO base station, the hybrid access terminal performs a dormant hand-off according to an 1xEV-DO process, but if not, the hybrid access terminal performs a dormant hand-off according to a CDMA 2000 1x process.

As described above, the embodiment of the present invention includes a process of upgrading location information of a hybrid access terminal for cross-paging and a process of performing cross-paging using the updated location information.

First, the process of upgrading location information of a hybrid access terminal for cross-paging will be described.

Figure 3:
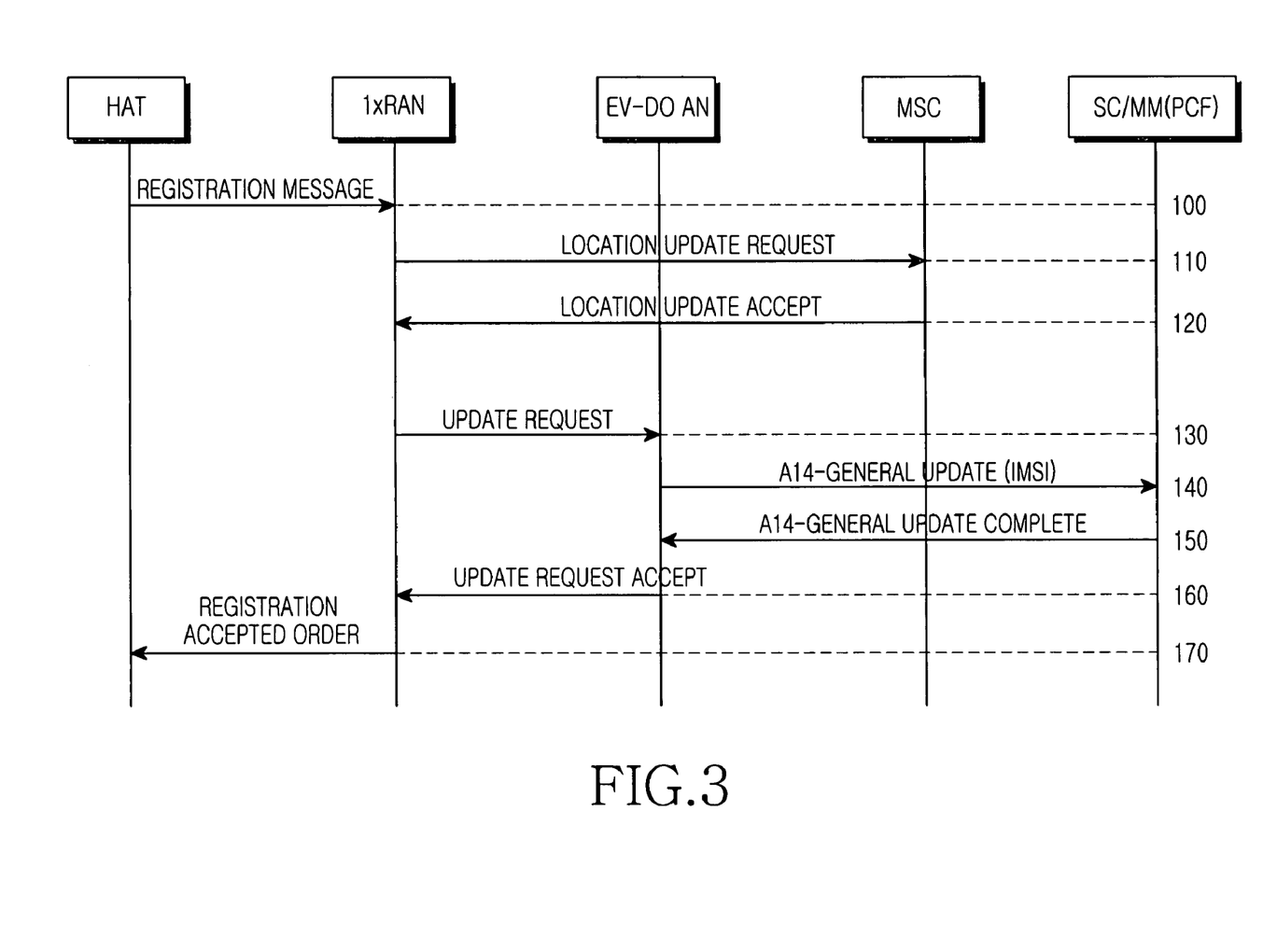
FIG. 3 is a flowchart illustrating messages representing a location update operation of a hybrid access terminal according to an embodiment of the present invention.

FIG. 3 is a flowchart illustrating messages representing a location update operation of a hybrid access terminal according to an embodiment of the present invention. In this drawing, the hybrid access terminal is at a state of monitoring only a paging channel of 1x base station in the IS-2000-Only slotted operation mode. Referring to FIG. 3, at step 100, the hybrid access terminal (HAT) transmits a location registration message including a value of a terminal-type indicator (hereinafter, referred to as "TTI") to the 1x base station (RAN). A format for the location registration message is shown in FIG. 4.

Figure 4:
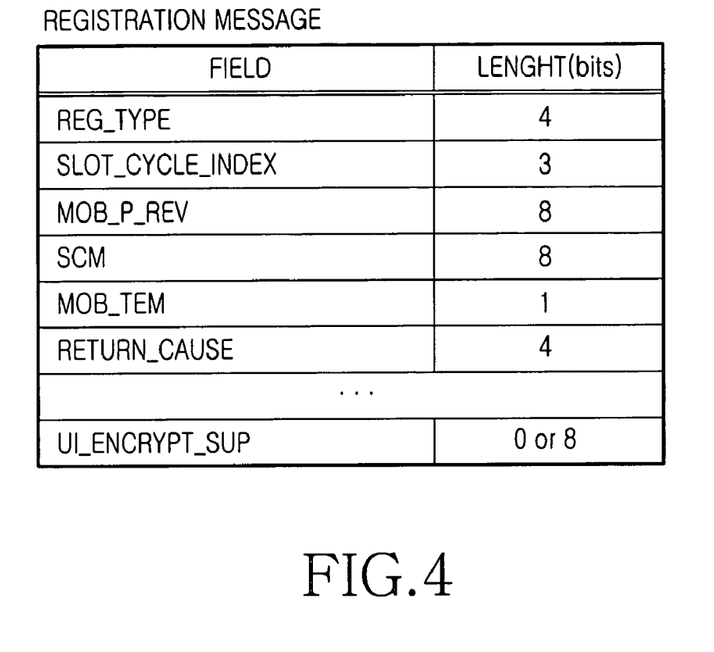
FIG. 4 is a table illustrating a format of a location registration message.

Referring to FIG. 4, the location registration message includes a registration-type (REG_TYPE) field for representing a location registration type, a slot cycle index (SLOT_CYCLE_INDEX) field for representing a period of monitoring a paging channel, and a station class mark (hereinafter, referred to as "SCM") field for setting up the value of the TTI as major fields. The SCM field is shown in FIG. 5.

Figure 5:
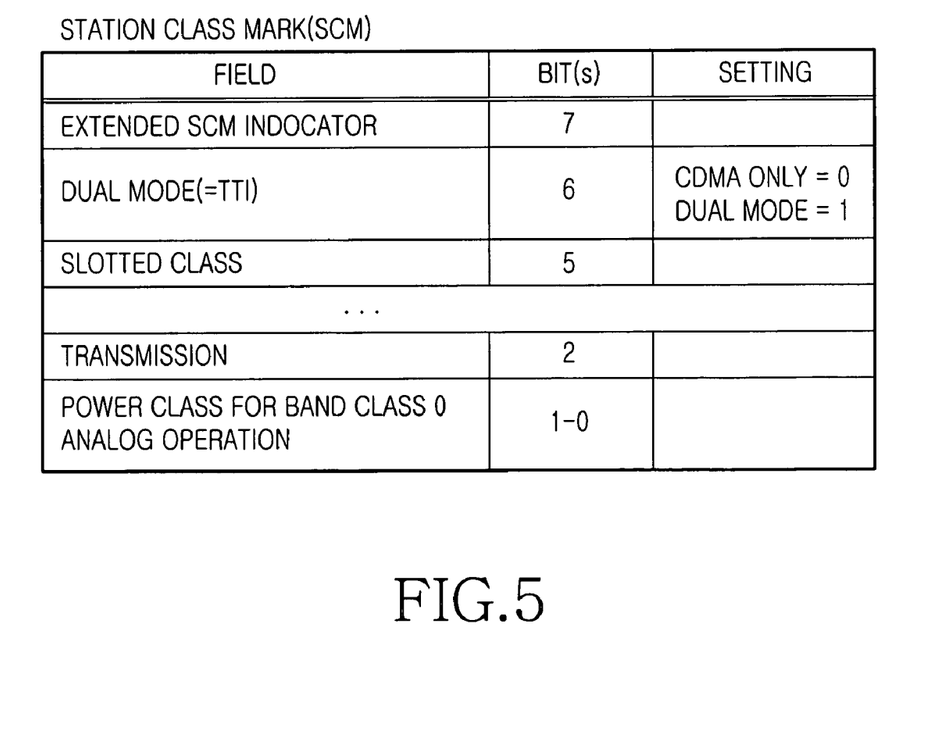
FIG. 5 is a table illustrating a station class mark (SCM) field included in the location registration message.

Referring to FIG. 5, a value of the TTI is set at a bit for a dual mode in the SCM field. For example, if a value of the dual mode bit is zero, a value of TTI is zero, which indicates that a terminal requesting location registration is a CDMA-Only terminal. Also, if a value of the dual mode bit is '1', a value of TTI is '1', which indicates that a terminal requesting location registration is a hybrid access terminal.

Figure 6:
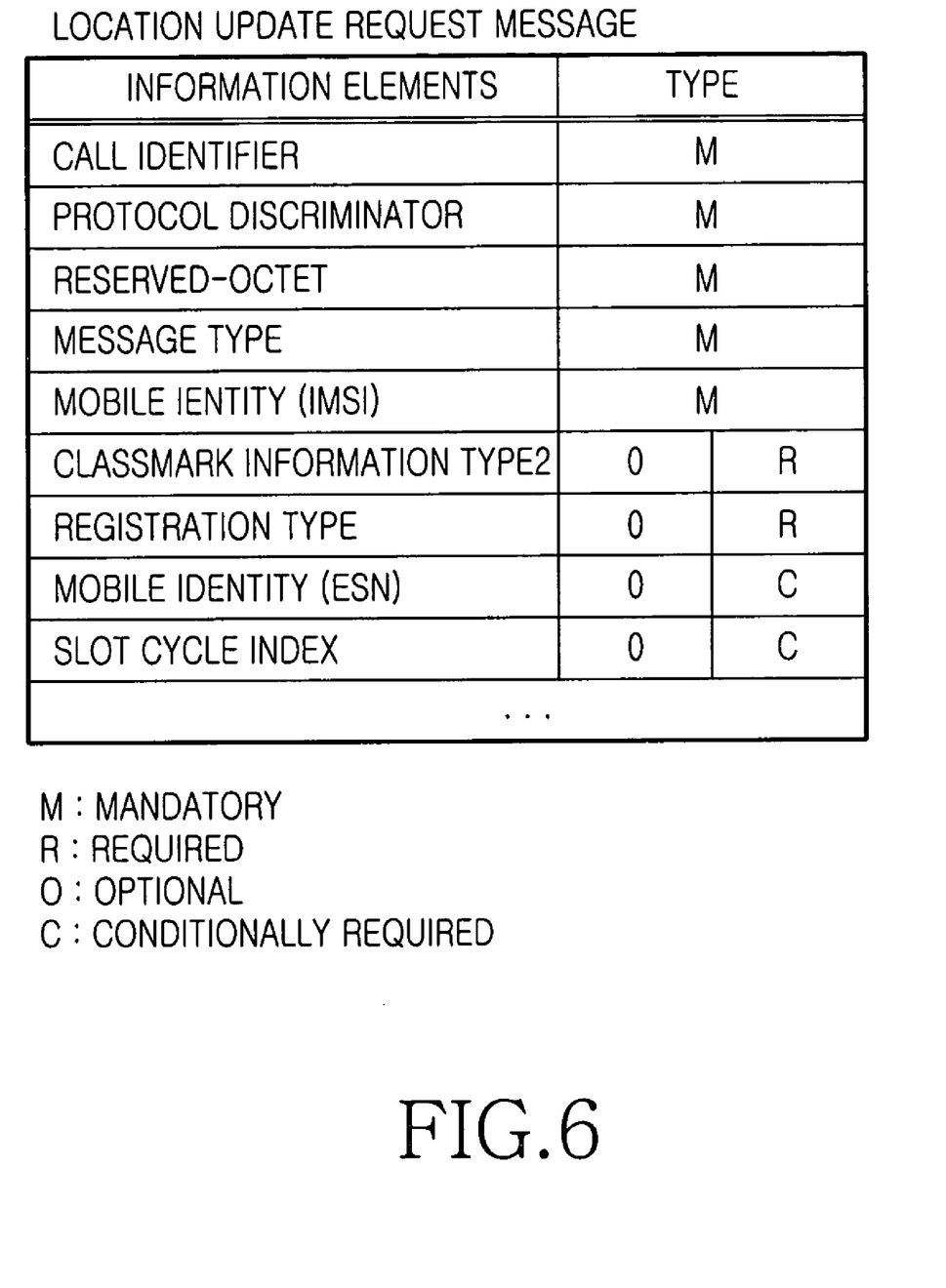
FIG. 6 is a table illustrating a format of a location update request message.

The 1x base station having received the location registration message checks a value of TTI included in the location registration message. As a result of the check, if the value of TTI is zero, which indicates a CDMA-Only terminal, location information according to the location registration message is registered only in the visitor location register (VLR) of the mobile switching center (MSC). In contrast, if the value of TTI is '1', which indicates that a terminal requesting location registration is a hybrid access terminal, location information according to the location registration message must be simultaneously updated in the visitor location register (VLR) of the mobile switching center (MSC) and in the packet control function (PCF/SC/MM) of the CDMA 2000 1xEV-DO system. Therefore, the 1x base station, first, transmits a location update request message to the mobile switching center (step 110). A format of the location update request message is shown in FIG. 6. In the format of the location update request message, field type 'M' indicates 'Mandatory', 'R' indicates 'Required', 'O' indicates 'Optional', and 'C' indicates 'Conditionally required'.

Referring to FIG. 6, the location update request message includes a cell identifier field for identifying the 1x base station transmitting the location update request message and a terminal identifier field (mobile identity) for identifying the terminal requesting location registration as major fields. In the CDMA 2000 1x system, it is defined that the terminal identifier field includes the IMSI.

At step 120, the mobile switching center transmits a location update acceptance message to the 1x base station in response to the location update request message of step 110, and stores the cell identifier and the terminal identifier as location information of the hybrid access terminal in the interior visitor location register.

When the location update is accepted by the mobile switching center, the 1x base station transmits an 1xEV-DO update request message to the 1xEV-DO base station (shown as 'EV-DO AN') to register the location of the hybrid access terminal in the CDMA 2000 1xEV-DO system (step 130). The 1xEV-DO update request message includes the International Mobile Subscriber Identity (IMSI) for identifying the terminal in the CDMA 2000 1xEV-DO system and the location information of the CDMA 2000 1xEV-DO system transmitted from the hybrid access terminal through the location update request message.

Figure 7:
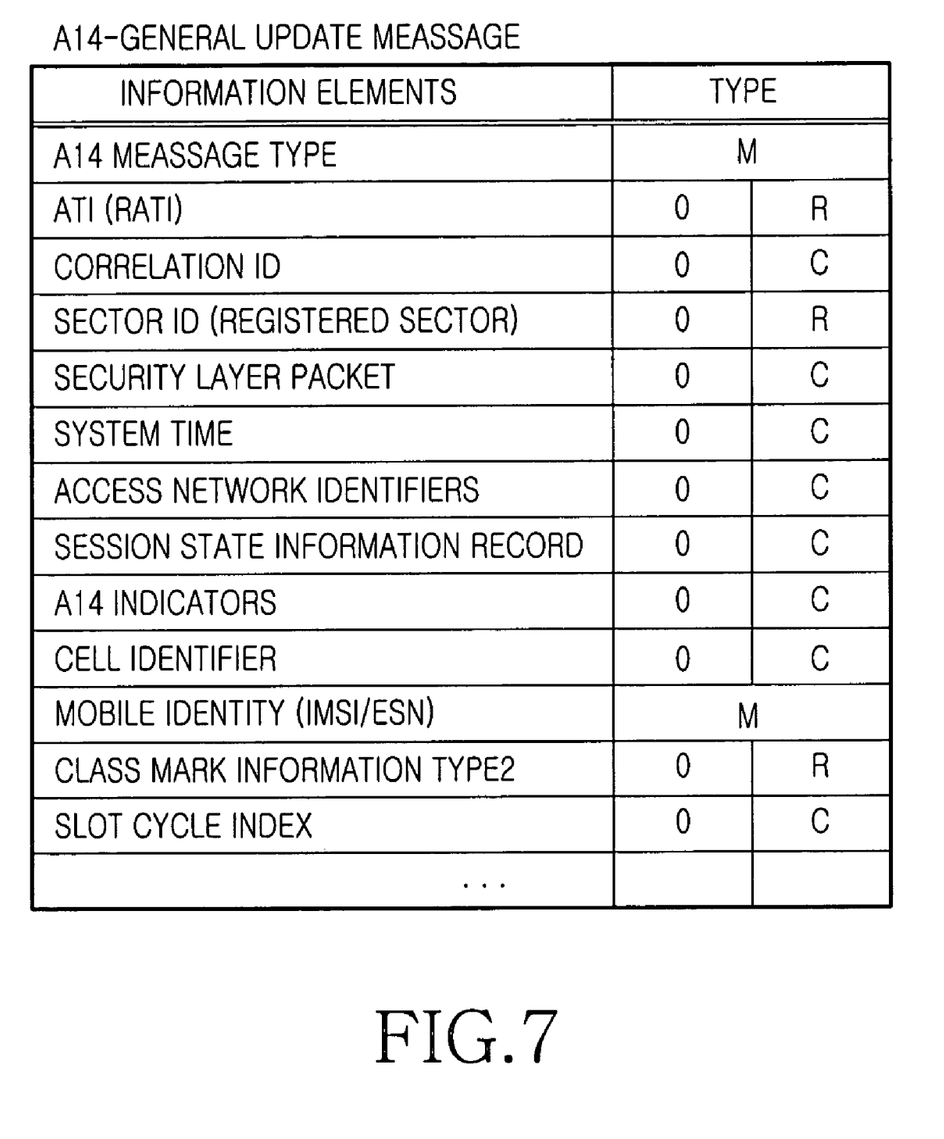
FIG. 7 is a table illustrating a format of an A14-general update request message.

Then, the 1xEV-DO base station transmits an A14-general update message according to interface 'A14' to the packet control function of the CDMA 2000 1xEV-DO system (step 140). The A14-general update message is shown in FIG. 7. Referring to FIG. 7, the A14-general update message includes an access terminal indicator (hereinafter, referred to as "ATI") field for identifying the terminal and a sector identifier (sector ID) for identifying the 1xEV-DO base station as major fields.

In the CDMA 2000 1xEV-DO system, it is defined that the ATI field includes an unicast access terminal identifier (UATI) of a terminal to request location registration. However, the 1xEV-DO base station cannot be provided with an UATI of a terminal from the 1x base station because the CDMA 2000 1x system does not use the UATI. Therefore, when location information is updated according to the CDMA 2000 1x, the ATI field is set as a random access terminal identifier (hereinafter, referred to as "RATI") which is randomly generated. The RATI is used afterward as basis information for determining whether or not the CDMA 2000 1xEV-DO system uses cross-paging. That is, according to a paging request for the hybrid access terminal, the CDMA 2000 1xEV-DO checks whether the ATI field of registered location information is set as the UATI or as the RATI. As a result of the check, if the ATI field is set as the UATI, which indicates that the hybrid access terminal is location-registered through the CDMA 2000 1xEV-DO system, the CDMA 2000 1xEV-DO system directly performs location registration of the corresponding hybrid access terminal. In contrast, if the ATI field is set as the RATI, which indicates that the hybrid access terminal is location-updated through the CDMA 2000 1x system, the CDMA 2000 1xEV-DO system performs cross-paging to the corresponding hybrid access terminal. Also, the A14-general update message further includes a cell identifier provided from the 1x base station and an IMSI for terminal identifier so as to identify a terminal.

However, although a detailed description will be omitted in the embodiment of the present embodiment, if the A14-general update message is used for updating of location information according to the 1xEV-DO, the ATI field is set as UATI of a terminal having requested location registration, and the cell identifier field and the terminal identifier field is not needed.

At step 150, the packet control function transmits an A14-general update completion message to the 1xEV-DO base station in response to the A14-general update message, and registers the location information of the hybrid access terminal to the SC/MM function section. Then, the 1xEV-DO base station transmits an 1xEV-DO update request acceptance message to the 1x base station (step 160), and the 1x base station transmits a location registration acceptance message (registration accepted order message) to the hybrid access terminal (step 170), so that the location registration process is completed.

The SC/MM function section stores mapping information of the UATI for identifying terminals in the CDMA 2000 1xEV-DO system and the IMSI for identifying the terminals in the CDMA 2000 1x system as well as location information of the terminals. Therefore, if a value of the IMSI exists in the A14-general update message, the packet control function determines that a terminal requesting location registration is a hybrid access terminal, but if not, the packet control function determines that a terminal requesting location registration is an 1xEV-DO-Only terminal.

Accordingly, when receiving an A14-general update message including a value of the IMSI from the 1xEV-DO base station, the SC/MM function section searches a database and determines whether or not location information corresponding to the value of the IMSI exists. As a result of the search, if the location information exists, the SC/MM function section overlaps new location information on existing location information, regardless of whether the existing location information has been obtained from the CDMA 2000 1x system or from the CDMA 2000 1xEV-DO system.

Figure 8:
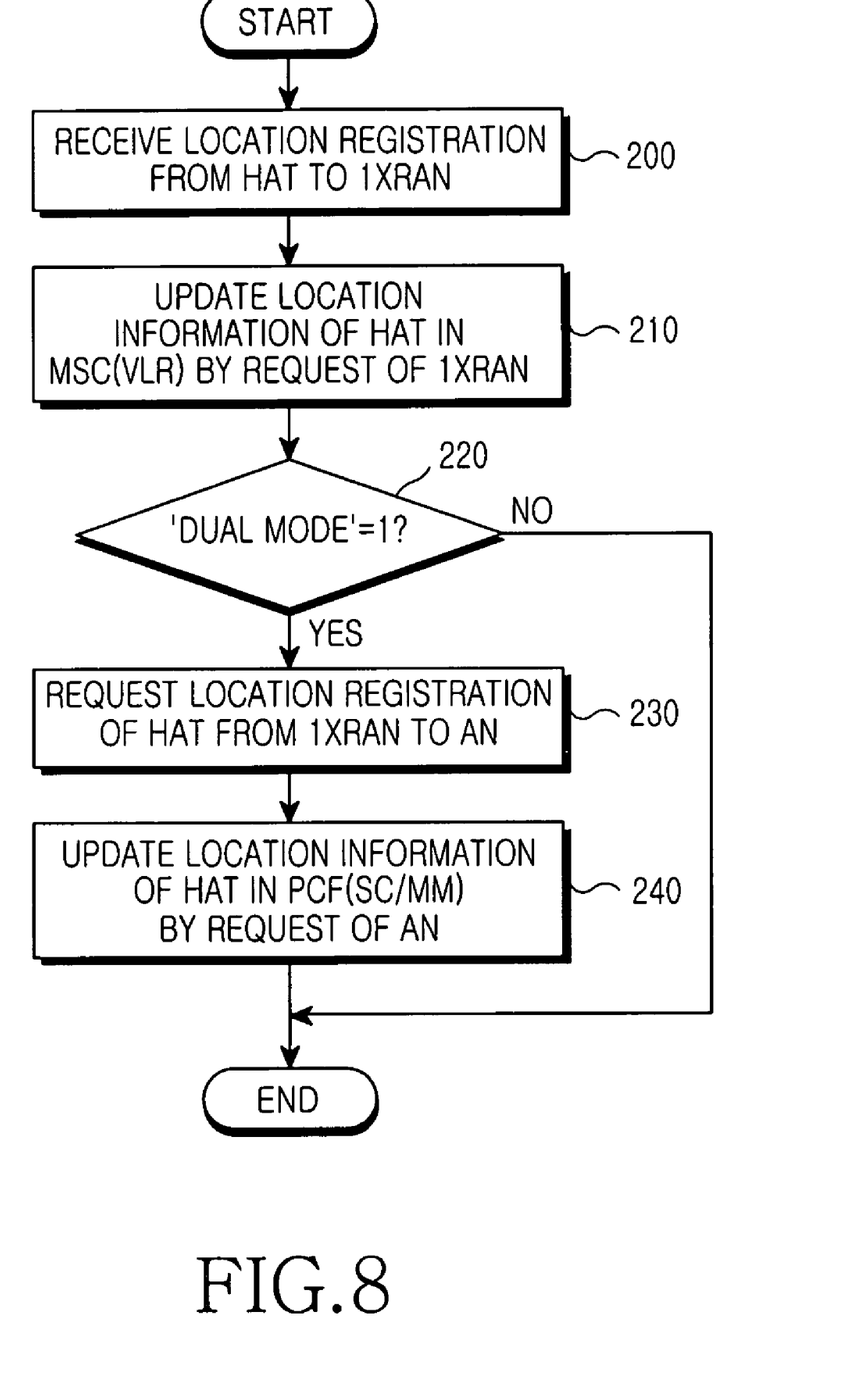
FIG. 8 is a flowchart illustrating the location update operation of the hybrid access terminal according to FIG. 3.

FIG. 8 is a flowchart for explaining the location update operation of the hybrid access terminal according to FIG. 3.

Referring to FIG. 8, when the 1x base station receives a location registration message from the hybrid access terminal (HAT) (step 200), the 1x base station transmits a location update request message to the mobile switching center (step 210), and the mobile switching center stores location information of the hybrid access terminal in the visitor location register.

Then, if the 1x base station confirms that an dual mode bit of the SCM field included in the location update registration message is set as '1' (step 220), the 1x base station transmits a location update request message including the location information and an IMSI, which is an identifier for the hybrid access terminal, to the 1xEV-DO base station of the CDMA 2000 1xEV-DO system (step 230) so that the location information of the hybrid access terminal can be registered also in the CDMA 2000 1xEV-DO system. Then, the 1xEV-DO base station transmits the location update request message to the packet control function of the CDMA 2000 1xEV-DO system to request location update of the hybrid access terminal, and the packet control function updates location information of the hybrid access terminal, corresponding to the IMSI included in the location update request message, in the SC/MM function section (step 240).

Figure 9:
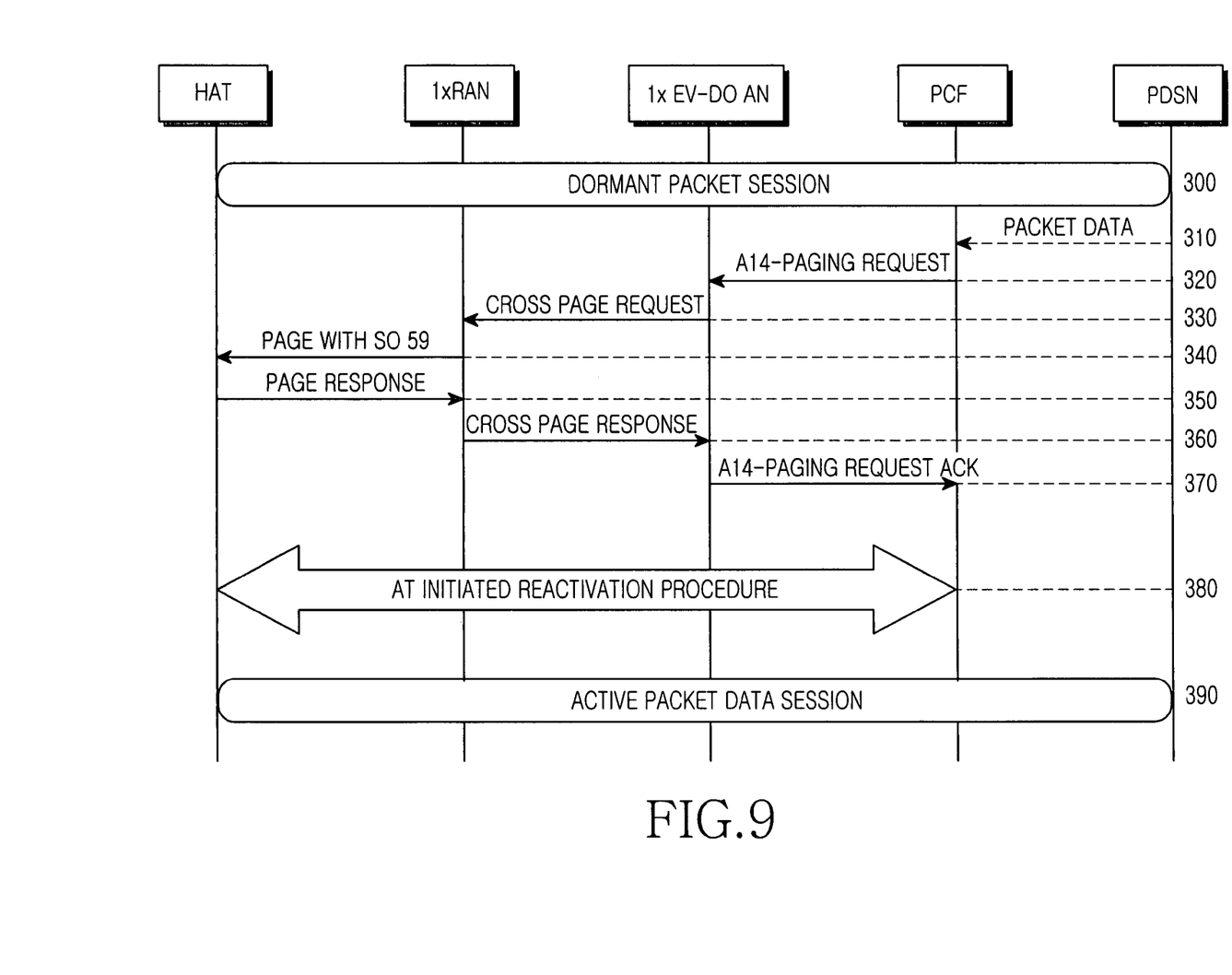
FIG. 9 is a flowchart illustrating messages representing a cross-paging operation of a hybrid access terminal according to an embodiment of the present invention.

FIG. 9 is a flowchart illustrating messages representing a cross-paging operation of a hybrid access terminal according to an embodiment of the present invention. Like the hybrid access terminal explained in FIG. 3, the hybrid access terminal of FIG. 9 is at a state of monitoring only a paging channel of 1x base station in the IS-2000-Only slotted operation mode. At such a state, in order to receive a paging of the CDMA 2000 1xEV-DO system, the following steps are performed.

Referring to FIG. 9, at step 300, under a condition in which a hybrid access terminal exchanges packet data with the 1xEV-DO base station at an active state, when transmission of packet data is not performed for a predetermined period of time, the hybrid access terminal is switched to a dormant state. At the dormant state, since any connection to the 1xEV-DO base station does not exist in the hybrid access terminal, it becomes impossible to manage location of the hybrid access terminal by a data transmission state, a control maintenance state, and the like means.

Figure 10:
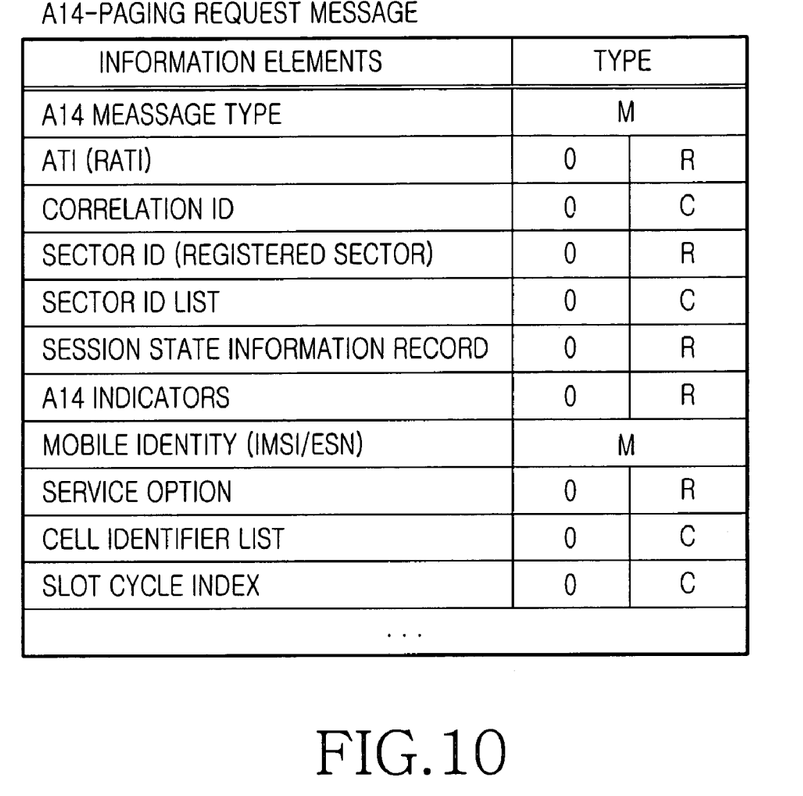
FIG. 10 is a table illustrating an A14-paging request message.

When a data packet to be transmitted to the hybrid access terminal occurs, the packet data service node (PDSN) transmits the data packet to the packet control function (PCF) of the CDMA 2000 1xEV-DO system (step 310). At step 320, the packet control function transmits an A14-paging request message to request packet service to the 1xEV-DO base station of the CDMA 2000 1xEV-DO system. A format of the A14-paging request message is shown in FIG. 10. Referring to FIG. 10, the A14-paging request message includes an ATI field for identifying a terminal and a sector identifier (sector ID) for identifying an 1xEV-DO base station as major fields.

In the CDMA 2000 1xEV-DO system, it is defined that the ATI field includes an UATI of a terminal which the CDMA 2000 1xEV-DO system wants to page. However, if location registration of the hybrid access terminal has been performed not through the CDMA 2000 1xEV-DO system but thorough the CDMA 2000 1x system, the ATI field is set as RATI. Therefore, the 1xEV-DO base station determines whether or not cross-paging is performed, according to whether or not the ATI field is set as RATI. If location registration of the hybrid access terminal, which the 1xEV-DO base station wants to page, has been performed through the CDMA 2000 1x system, the A14-paging request message further includes a cell identifier of the 1x base station provided from the CDMA 2000 1x system and an IMSI for terminal identity so as to identify the terminal.

Although a detailed description will be omitted for conciseness in the embodiment of the present embodiment, if the A14-paging request message is used for paging of a terminal location-registered through the CDMA 2000 1xEV-DO system, the ATI field is set as UATI of a terminal which the 1xEV-DO base station wants to page, and the cell identifier field and the terminal identifier field is not needed.

Figure 11:
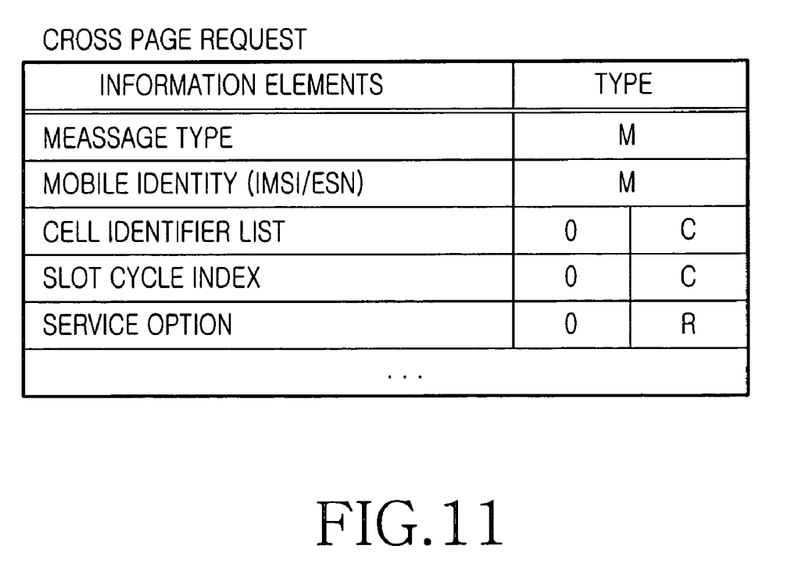
FIG. 11 is a table illustrating a format of a cross-paging request message.

At step 330, if the ATI field of the A14-paging request message is set as RATI, the 1xEV-DO base station determines cross-paging to be required, detects the cell identifier and the terminal identifier from the A14-paging request message, and transmits a cross-paging request message for requesting a paging of the hybrid access terminal corresponding to the IMSI into the 1x base station corresponding to the cell identifier. A format of the cross-paging request message is shown in FIG. 11. Referring to FIG. 11, the cross-paging request message includes a terminal identifier field having an IMSI/Electronic Serial Number (ESN) to identify a terminal.

At step 340, the 1x base station transmits a paging message through a paging channel to a hybrid access terminal corresponding to the IMSI included in the A14-paging request message. The paging message includes a service option defined for cross-paging. When receiving a paging response message from the hybrid access terminal (step 350), the 1x base station transmits a cross-paging response message to the 1xEV-DO base station (step 360), and then the 1xEV-DO base station transmits an A14-paging request acknowledgment message to the packet control function (step 370).

Then, at step 380, a reactivation procedure of a pack data session is performed between the hybrid access terminal and the packet control function. Specifically, in the reactivation procedure, the hybrid access terminal transmits a connection request message for connection of a traffic channel into the 1xEV-DO base station, and the 1xEV-DO base station transmits a setup message (A9-Setup-A8 message) to the packet control function. After receiving a connection message (A9-Connect-A8 message) from the packet control function, the 1xEV-DO base station transmits a traffic channel assignment message to the hybrid access terminal to notify the hybrid access terminal that a traffic channel is assigned. When a traffic channel is assigned as described above, the hybrid access terminal transmits and receives packet data through the packet data session which is activated with the packet data service node.

Figure 12:
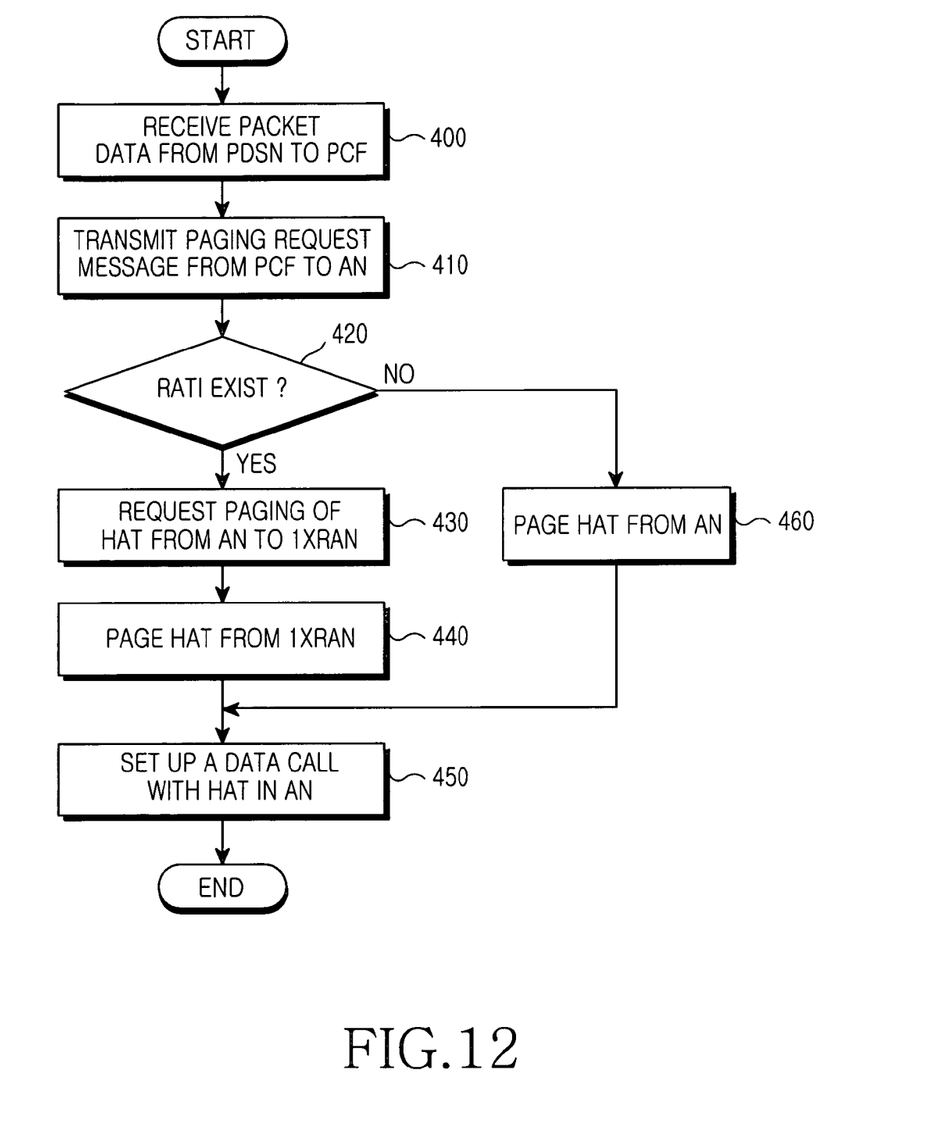
FIG. 12 is a flowchart illustrating the cross-paging operation of the hybrid access terminal according to FIG. 9.

FIG. 12 is a flowchart illustrating the cross-paging operation of the hybrid access terminal according to FIG. 9.

Referring to FIG. 12, when receiving packet data, which should be transmitted to the hybrid access terminal, from packet data service node (step 400), the packet control function transmits a paging request message to page the hybrid access terminal into the 1xEV-DO base station (AN) (step 410). At step 420, the 1xEV-DO base station confirms whether the ATI field of the paging request message is set as a predetermined value of the UATI or a value of a random ATI (RATI). As a result of the confirmation, if the ATI field of the paging request message is not set as a value of a RATI, the 1xEV-DO base station goes to step 460 to perform direct paging of the hybrid access terminal. In contrast, if the ATI field of the paging request message is set as a value of a RATI, the 1xEV-DO base station performs step 430.

At step 430, the 1xEV-DO base station obtains a cell identifier of a 1x base station, in which location of the hybrid access terminal has been registered, from the paging request message, and then the 1xEV-DO base station transmits a cross-paging request message for requesting a paging of the hybrid access terminal into the 1x base station. Then, the 1x base station pages the hybrid access terminal in response to the cross-paging request message, and then transmits a response thereof into the 1xEV-DO base station (step 440).

When the direct paging by step 460 or the cross-paging by step 440 is achieved, the 1xEV-DO base station sets a data call with the hybrid access terminal and transmits the packet data (step 450).

While the invention has been shown and described with reference to certain embodiments thereof, it will be understood by those skilled in the art that various changes in form and details may be made therein without departing from the spirit and scope of the invention as defined by the appended claims. For example, when it is confirmed that a terminal requesting location registration is a hybrid access terminal, the CDMA 2000 1x system can register location information of the hybrid access terminal into the CDMA 2000 1xEV-DO system, without confirming a value of a 'dual mode' field in a location registration message which provided from the hybrid access terminal. Accordingly, the scope of the invention is not to be limited by the above embodiments but by the claims and the equivalents thereof.

What is claimed is:

1. A method of paging in mobile communication systems, the method comprising the steps of:
   a mobile terminal transmitting a location registration message to a mobile communication system, the location registration message includes information to determine whether or not a heterogeneous mobile communication system registers location information of the mobile terminal, wherein the mobile communication system comprises a circuit-switched network;
   the mobile communication system transmitting location information to the heterogeneous mobile communication system, wherein the heterogeneous mobile communications system comprises a packet-switched network;
   the heterogeneous mobile communication system requesting the mobile communication system to page the mobile terminal according to the received information; and
   the mobile communication system paging the mobile terminal.

2. The method as claimed in claim 1, further comprising a step of the heterogeneous mobile communication system setting up a packet data call with the mobile terminal and the heterogeneous mobile communication system providing the mobile terminal with packet data service.

3. The method as claimed in claim 1, wherein the location information further includes a first identifier.

4. The method as claimed in claim 3, further comprising a step of the heterogeneous mobile communication system registering the first identifier and the location information.

5. The method as claimed in claim 4, wherein the heterogeneous mobile communication system changes the first identifier to a second identifier which is randomly generated to identify the mobile terminal.

6. The apparatus of cross-paging in mobile communication systems, the apparatus comprising:
   a mobile terminal for generating location registration message and transmitting the location registration message to a mobile communication system, the location registration message includes information to determine whether or not a heterogeneous mobile communication system registers location information of the mobile terminal, wherein the mobile communication system comprises a circuit-switched network;
   a mobile communication system for transmitting location information of the mobile terminal to the heterogeneous mobile communication system, wherein the heterogeneous mobile communications system comprises a packet-switched network; and
   a heterogeneous mobile communication system for requesting the mobile communication system to page the mobile terminal according to the received information.

7. The apparatus of claim 6, wherein the location information further includes a first identifier.

8. The apparatus of claim 6, wherein the mobile communication system pages to the mobile terminal.

9. The apparatus of claim 7, wherein the heterogeneous mobile communication system sets up a packet data call with the mobile terminal, provides the mobile terminal with packet data service and registers the first identifier and the location information.

10. The apparatus of claim 7, wherein the heterogeneous mobile communication system changes the first identifier to a second identifier which is randomly generated to identify the mobile terminal.

* * * * *